(12) United States Patent
Rouleau et al.

(10) Patent No.: US 12,331,861 B2
(45) Date of Patent: Jun. 17, 2025

(54) CABLE BUNDLE HANGER WITH PIVOT JOINT

(71) Applicant: Panduit Corp., Tinley Park, IL (US)

(72) Inventors: Rodney G. Rouleau, Manhattan, IL (US); Bartolo A. Nambo, Palos Heights, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/378,212

(22) Filed: Oct. 10, 2023

(65) Prior Publication Data

US 2025/0116355 A1    Apr. 10, 2025

(51) Int. Cl.
*F16L 3/12*    (2006.01)

(52) U.S. Cl.
CPC ................... *F16L 3/1218* (2013.01)

(58) Field of Classification Search
CPC . F16L 3/1218; F16L 3/14; F16L 3/133; F16L 3/23; H02G 7/05; H02G 7/053; H02G 7/06; H02G 7/08
See application file for complete search history.

(56) References Cited

U.S. PATENT DOCUMENTS

| | | | | |
|---|---|---|---|---|
| 507,394 A | * | 10/1893 | Trewhella | F16B 45/012 248/339 |
| 757,944 A | * | 4/1904 | Meyercord | B42F 1/08 24/351 |
| 815,060 A | * | 3/1906 | Beebe | A47G 25/0692 248/214 |
| 981,270 A | * | 1/1911 | Hurff | A01F 25/12 211/125 |
| 1,493,694 A | * | 5/1924 | Morse | A63G 9/12 248/341 |
| 1,720,746 A | | 7/1929 | Povlsen et al. | |
| 2,923,508 A | | 2/1960 | Daugherty | |
| 2,988,842 A | * | 6/1961 | Seufert | C11D 17/00 248/686 |
| 3,219,302 A | * | 11/1965 | Smith | A47G 1/20 248/905 |
| 3,240,463 A | * | 3/1966 | Cook | A47G 29/083 248/303 |
| 3,323,766 A | | 6/1967 | Schauster | |
| 3,469,710 A | * | 9/1969 | Vosbikian | E05B 73/02 248/222.51 |
| 3,935,603 A | * | 2/1976 | Bryant | A47D 9/012 5/200.1 |
| 3,995,822 A | | 12/1976 | Einhorn et al. | |

(Continued)

FOREIGN PATENT DOCUMENTS

GB    2546472 A  *  7/2017  ......... E04H 12/2253

*Primary Examiner* — Eret C McNichols
(74) *Attorney, Agent, or Firm* — Aimee E. McVady; Christopher S. Clancy; James H. Williams (57) ABSTRACT

A cable bundle hanger secures cables routed to solar panels. The cable bundle hanger includes an attachment section and a lower section. The attachment section engages a solar panel frame to secure the cable bundle hanger. The attachment section includes an attachment member and a pivot joint ring. The lower section is pivotally secured to the attachment section. The lower section has a swaged top member. The swaged top member pivots within the pivot joint ring thereby enabling the lower section to pivot with respect to the attachment section.

9 Claims, 7 Drawing Sheets

(56) References Cited

U.S. PATENT DOCUMENTS

| | | | | |
|---|---|---|---|---|
| 4,131,259 A * | 12/1978 | Franks | ............. | A47G 7/044 |
| | | | | D6/535 |
| 4,658,100 A | 4/1987 | Suris | | |
| D300,302 S * | 3/1989 | Possemato | ............. | D8/367 |
| 4,957,259 A * | 9/1990 | Wolf, Jr. | ............. | A47F 5/0006 |
| | | | | 248/315 |
| 5,303,885 A * | 4/1994 | Wade | ............. | F16L 3/133 |
| | | | | 248/62 |
| 5,490,650 A * | 2/1996 | Pendergrass | ............. | A47F 5/0823 |
| | | | | 248/303 |
| 5,957,416 A | 9/1999 | Sellati | | |
| 6,123,305 A | 9/2000 | Lukasavitz | | |
| 6,257,421 B1 * | 7/2001 | Outten | ............. | G11B 33/0411 |
| | | | | 248/303 |
| 6,364,266 B1 * | 4/2002 | Garvin | ............. | F16L 3/02 |
| | | | | 248/303 |
| 6,659,414 B1 * | 12/2003 | Guilmette | ............. | E06C 7/146 |
| | | | | 248/303 |
| 7,051,886 B1 * | 5/2006 | Han | ............. | C11D 17/041 |
| | | | | 211/85.12 |
| 7,117,650 B2 * | 10/2006 | Dockery | ............. | E04B 9/205 |
| | | | | 248/302 |
| 7,137,607 B2 * | 11/2006 | Hibbs | ............. | B62J 11/00 |
| | | | | 248/302 |
| 7,217,181 B2 * | 5/2007 | Frederick | ............. | A22C 25/06 |
| | | | | 452/185 |
| D585,265 S * | 1/2009 | Meyers | ............. | D8/370 |
| 7,703,735 B2 * | 4/2010 | Fryer | ............. | A47G 25/0614 |
| | | | | 24/372 |
| 8,286,928 B2 * | 10/2012 | Lien | ............. | F16B 35/06 |
| | | | | 248/303 |
| 9,671,046 B2 | 6/2017 | Whipple et al. | | |
| 9,800,028 B1 | 10/2017 | Smith et al. | | |
| 10,063,039 B2 | 8/2018 | Smith et al. | | |
| 10,070,745 B2 * | 9/2018 | Blevins | ............. | A47G 25/1471 |
| 10,125,898 B2 | 11/2018 | Whipple et al. | | |
| 10,670,170 B2 * | 6/2020 | Shea | ............. | F16L 3/127 |
| 11,437,790 B2 | 9/2022 | Smith et al. | | |
| 11,534,032 B1 * | 12/2022 | Twilla | ............. | A47J 47/16 |
| 11,979,008 B2 * | 5/2024 | Rand | ............. | H02G 3/30 |
| 2007/0114350 A1 * | 5/2007 | Sorci | ............. | A47G 29/083 |
| | | | | 248/304 |
| 2013/0014352 A1 * | 1/2013 | Wells | ............. | F16B 45/012 |
| | | | | 24/265 H |
| 2015/0051827 A1 | 2/2015 | Persson | | |
| 2016/0258554 A1 * | 9/2016 | Ripoll Agullo | ............. | F16L 3/1033 |
| 2022/0038046 A1 * | 2/2022 | Wedding | ............. | H02G 3/30 |
| 2022/0074522 A1 * | 3/2022 | Stubben | ............. | F16B 2/248 |
| 2022/0255300 A1 * | 8/2022 | Rand | ............. | F16L 3/06 |
| 2023/0141833 A1 | 5/2023 | Rand et al. | | |
| 2023/0147676 A1 * | 5/2023 | Rand | ............. | H02G 3/263 |
| | | | | 248/303 |

* cited by examiner

CABLE BUNDLE HANGER WITH PIVOT JOINT

FIELD OF THE INVENTION

The present invention relates to a cable bundle hanger, and more particularly to a cable bundle hanger with a pivot joint.

BACKGROUND OF THE INVENTION

Global energy consumption continues to increase with a majority of the energy source coming from fossil fuels. While the demand for energy is unlikely to decrease, the source of energy is changing with the introduction of renewable energy. Renewable energy comes in many forms; however, solar energy has become economically viable and solar projects are increasing in number and scale.

Figure 1A:
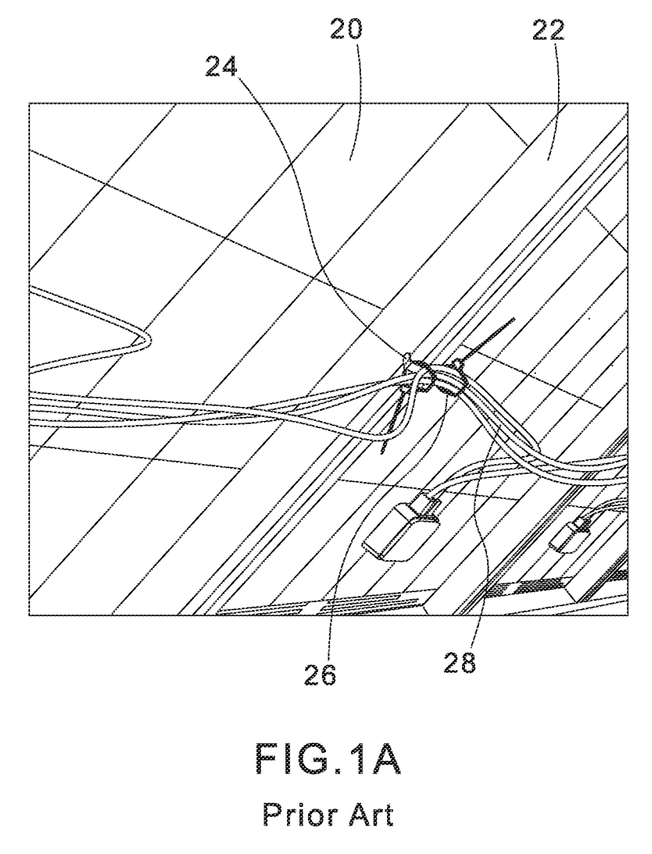
FIG. 1A is a perspective view of a prior art mount and cable ties secured to solar panels.
Figure 1B:
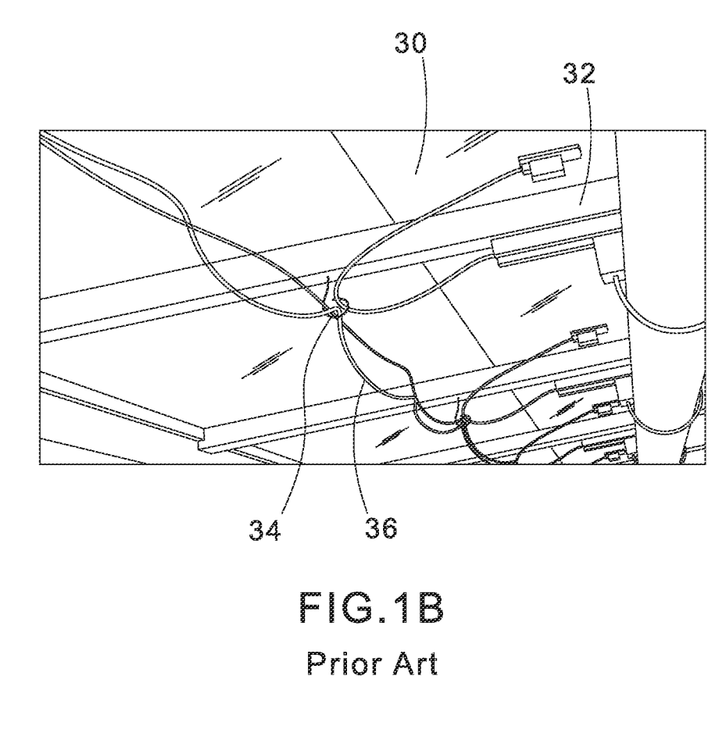
FIG. 1B is a perspective view of prior art cable bundle hangers and cable ties secured to solar panels.

Solar energy farms consist of numerous rows of photovoltaic (PV) panels mounted to frames. The frames can either be stationary or mobile to track the movement of the sun during daylight hours. The photovoltaic panels are electrically connected with taps that extend from the photovoltaic panel to photovoltaic run wires and cables. The run wires and cables are typically suspended or attached to the frame by a cable bundle hanger, mount, clips, or cable tie. FIGS. 1A and 1B illustrate examples of run wires and cables connected to solar panels, 20, 30, respectively. FIG. 1A illustrates mounts 24 or clips securing wires 28 to frame 22 of solar panels 20. Cable ties 26 bundle the wires 28 to route along the frame 22. FIG. 1B illustrates cable bundle hangers 34 secured to frames 32 of solar panels 30 with the run wires 36 or cables hooked on the cable bundle hangers 34.

Figure 2A:
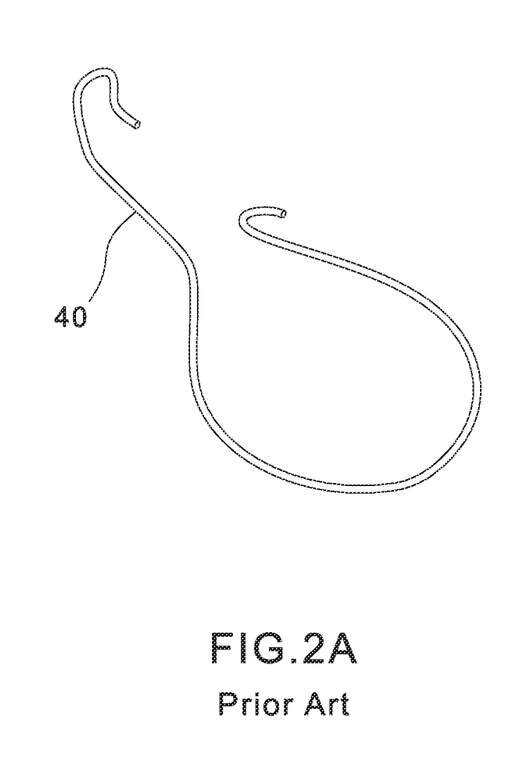
FIG. 2A is a perspective view of a prior art cable bundle hanger.
Figure 2B:
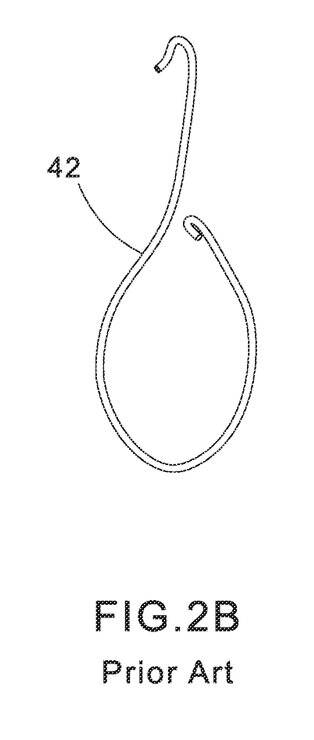
FIG. 2B is a perspective view of a prior art cable bundle hanger.
Figure 2C:
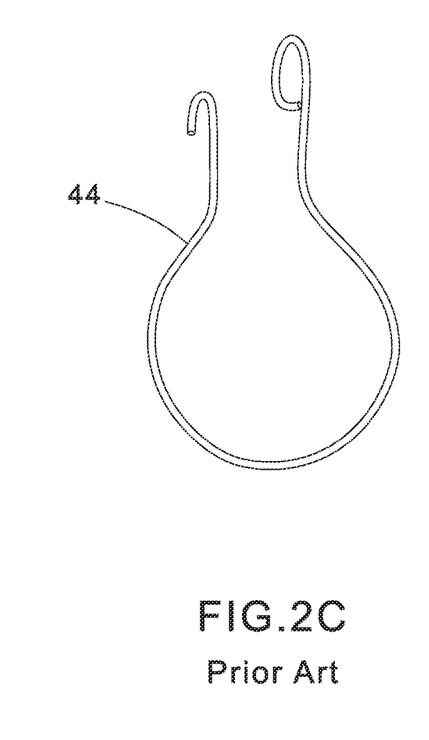
FIG. 2C is a perspective view of a prior art cable bundle hanger.

Cable bundle hangers have various mounting options, such as a hole, a vertical bolt 40 (see FIG. 2A), a frame flange 42 (see FIG. 2B), and a horizontal bolt 44 (see FIG. 2C). While these types of cable bundle hangers work for some stationary panels, the installation angles of stationary solar panels can be an issue depending on the mounting options available. Mobile panels that track the movement of the sun could be a bigger issue. As the solar panels move, the cable bundle hangers could shift to positions that create side forces that move or disengage the cable bundle hangers over time. Abrasion of the cables could also be an issue as the polymer cables rub on the steel cable bundle hangers.

Thus, there is a need for an improved cable bundle hanger that rotates with mobile panels to reduce or eliminate tension between the cable bundle hangers and the cables therein.

SUMMARY OF THE INVENTION

The present invention is direction a cable bundle hanger used for securing cables to solar panels. The cable bundle hanger includes an attachment section and a lower section pivotally secured to the attachment section. The attachment section engages a solar panel frame to secure the cable bundle hanger. The attachment section includes an attachment member and a pivot joint ring. The lower section is pivotally secured to the attachment section. The lower section has a swaged top member. The swaged top member pivots within the pivot joint ring thereby enabling the lower section to pivot with respect to the attachment section.

DETAILED DESCRIPTION

Figure 3:
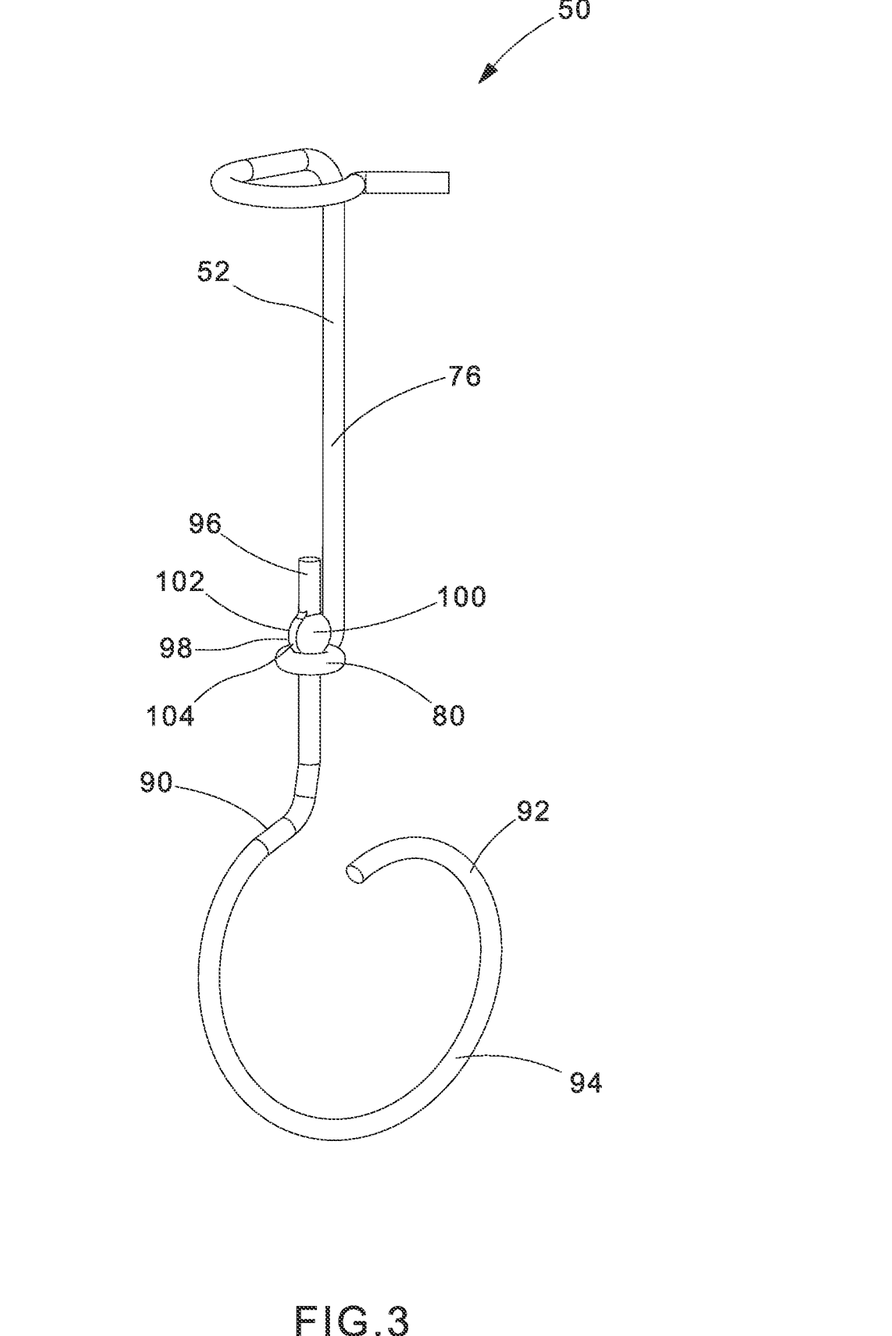
FIG. 3 is a perspective view of the cable bundle hanger with pivot joint of the present invention.

FIG. 3 illustrates the cable bundle hanger 50 with pivot joint of the present invention. The cable bundle hanger 50 with pivot joint includes two wire sections that form an attachment section 52 and a lower section 90. The attachment section 52 includes an attachment member 54, a stem 76, and a pivot joint ring 80. The attachment member 54 is connected to the stem 76 to create space between the attachment member 54 and the pivot joint ring 80. The stem 76 is a straight cylindrical member. The pivot joint ring 80 is a circular with an open center 82.

Figure 4:
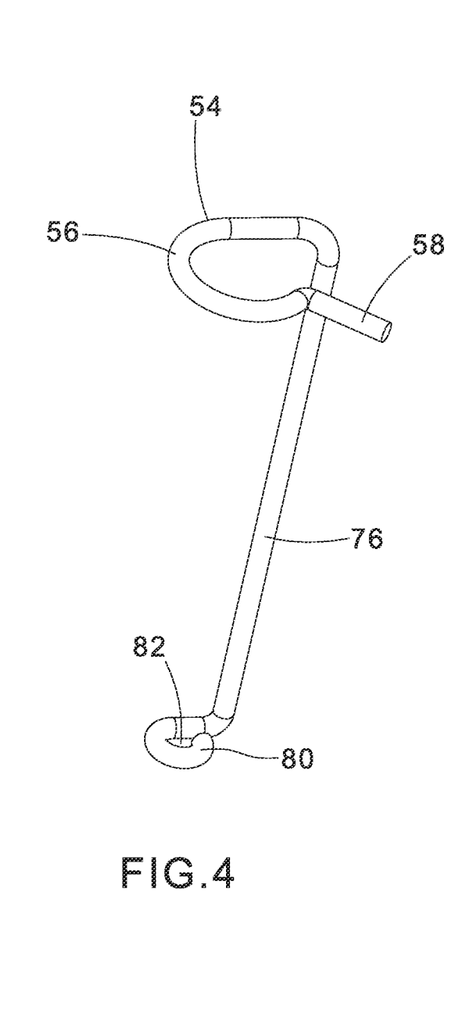
FIG. 4 is a perspective view of the attachment member of the cable bundle hanger of FIG. 3 configured for attachment to a vertical bolt.
Figure 5:
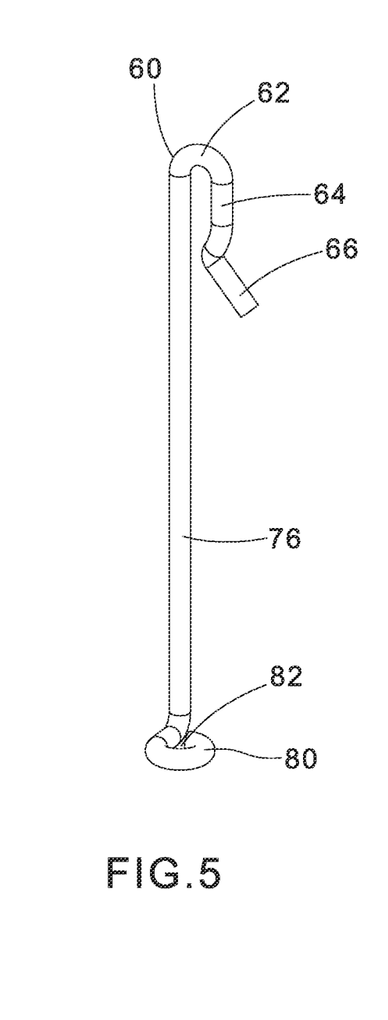
FIG. 5 is a perspective view of an alternative attachment member of the cable bundle hanger of FIG. 3 configured for attachment to a flange or edge.
Figure 6:
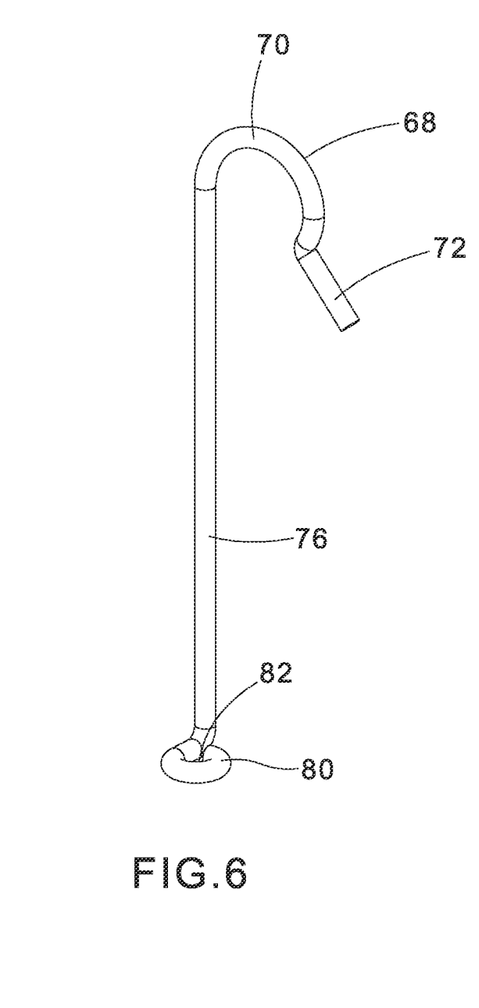
FIG. 6 is a perspective view of an alternative attachment member of the cable bundle hanger of FIG. 3 configured for attachment to a horizontal bolt.

The attachment member may be formed with different attachment configurations, as illustrated in FIGS. 4-6. As illustrated in FIG. 4, the attachment member 54 includes a generally C-shaped member 56 positioned in a plane that is perpendicular to the stem 76. The attachment member 54 also includes a straight end 56. The C-shaped member 56 is shaped to receive a vertical bolt to secure the cable bundle hanger to solar panels. As illustrated in FIG. 5, the attachment member 60 includes a hook member 62 and a vertical member 64 that extends parallel to the stem 76. The attachment member 60 also includes a straight end 66. The attachment member 60 is shaped to mount to a predrilled hole in a flange or edge of a frame between solar panels. As illustrated in FIG. 6, the attachment member 68 includes a curved member 70 that extends away from the stem 76. The attachment member 68 also includes a straight end 72. The curved member 70 is shaped to receive a horizontal bolt to secure the cable bundle hanger to solar panels.

The lower section 90 includes one end 92 with an open bridle ring 94 and an opposite second end 96 with a swaged top member 98. The open bridle ring 94 receives and holds cables without the use of a clip to secure or close the bridle ring 94. The swaged top member 98 is a flatten portion of the cylindrical metal cable bundle hanger. The swaged top member 98 includes a front circular portion 100, a back circular portion 102, and curved outer edges 104. The swaged top member 98 provides a stop preventing the lower section 90 from exiting the pivot joint ring 80 when installed therein. The swaged top member 98 pivots within the pivot joint ring 80 thereby enabling the lower section 90 to pivot with respect to the attachment section 52.

Figure 7:
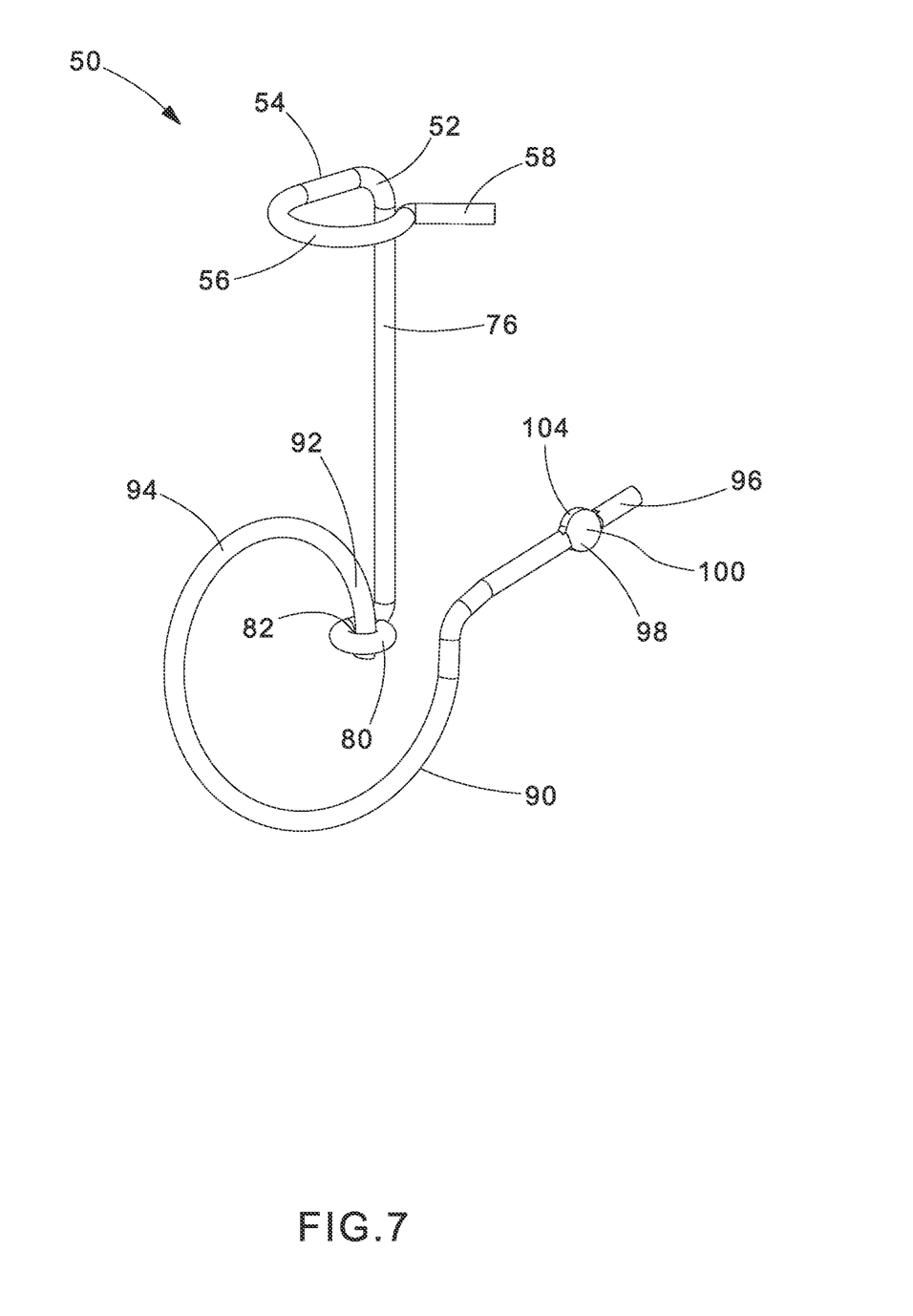
FIG. 7 is a perspective view of the attachment member of FIG. 4 and the lower section positioned to be joined to the attachment member.
Figure 8:
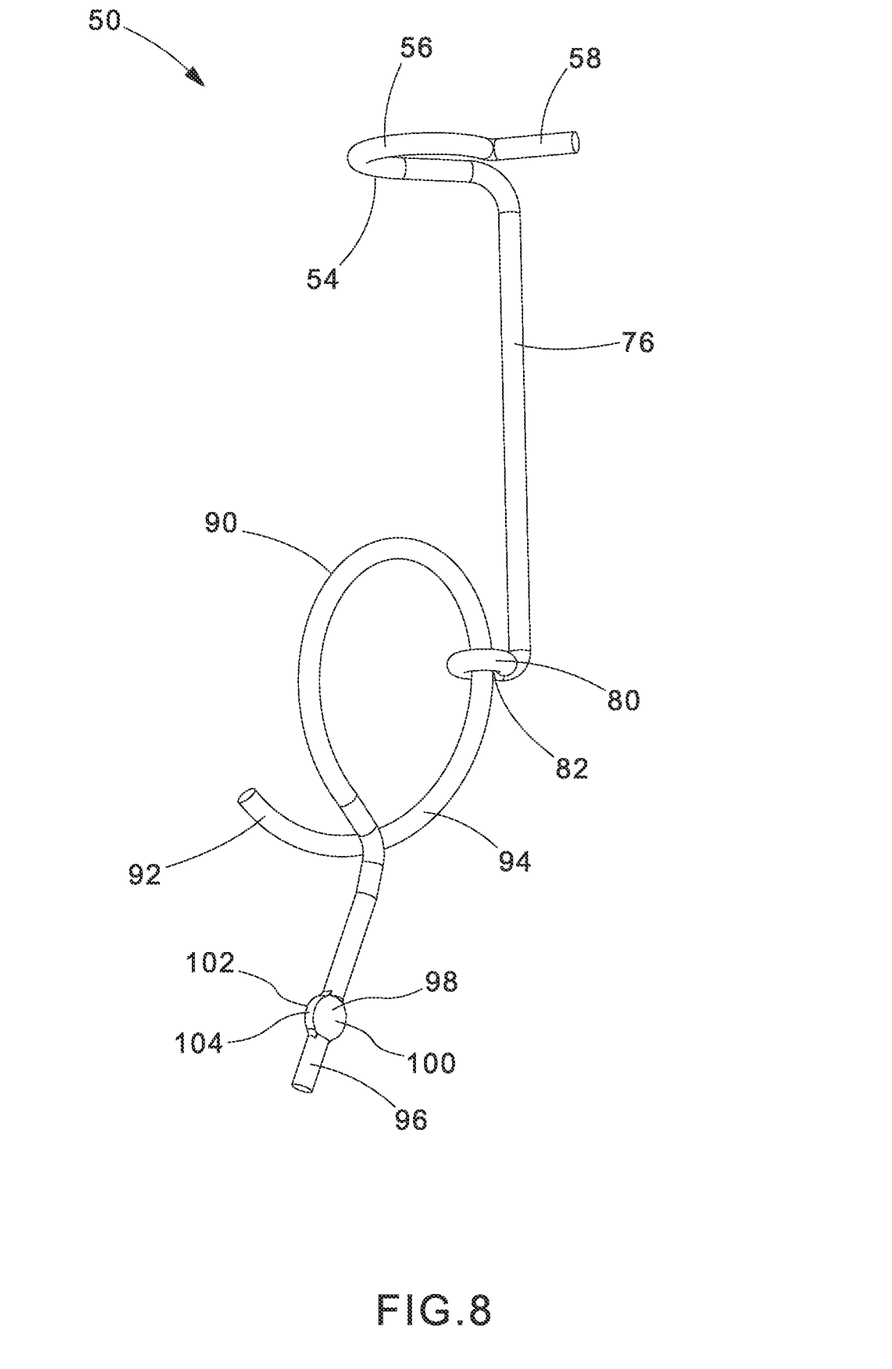
FIG. 8 is a perspective view of the attachment member of FIG. 7 with the lower section partially installed in the attachment member.
Figure 9:
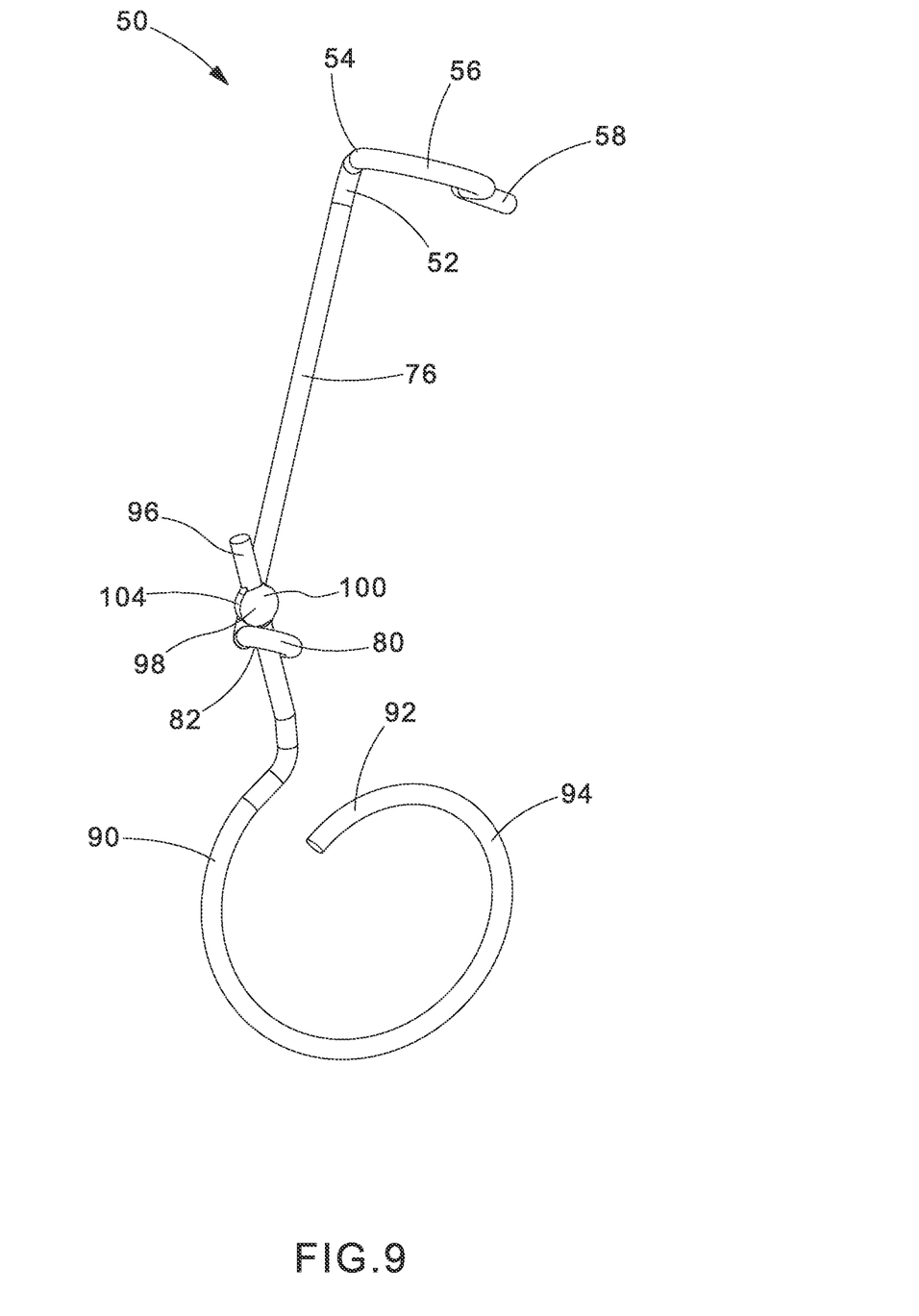
FIG. 9 is a perspective view of the attachment member of FIG. 8 and the lower section pivotally joined to the attachment member.

As illustrated in FIGS. 7 and 8, the attachment section 52 and the lower section 90 are joined by threading the bridle ring 94 of the lower section 90 through the opening 82 in the pivot joint ring 80 of the attachment section 52. The lower section 90 is fed through the pivot joint ring 80 until the swaged top member 98 contacts the pivot joint ring 80, as seen in FIG. 9. The swaged top member 98 is designed to rest and pivot, if necessary, on the pivot joint ring 80.

As set forth above, the cable bundle hanger with pivot joint may be installed on a vertical bolt, a flange or edge, or a horizontal bolt. Often the installation of the solar panels and required wires or cabling includes placement at various angles. The pivot joint of the cable bundle hanger of the present invention helps to reduce cantilevered loads, offset forces or moments exerted on the cable bundle hanger and wires or cables thereby preventing damage or dislocation of the cable bundle hanger. The pivot joint will reduce the cantilevered loads for stationary solar panels and for mobile solar panels. After the cable bundle hanger is firmly installed, the wires and cables can be added to the bridle ring. The swaged top member enables the bridle ring to tilt and rotate 360 degrees which eases the solar cable or wire installation process. The ability of the cable bundle hanger to tilt and rotate at any angle also reduces stresses on the cables or wires in the cable bundle hanger. The bridle ring rotation reduces or eliminates the uneven tension between cable bundle hangers used with multiple solar panels.

The cable bundle hanger of the present invention is formed from stainless steel. The cable bundle hanger is easy to install and can be designed with multiple installation attachment options. The cable bundle hanger with pivot joint reduces cable abrasion for mobile solar panels. The cable bundle hanger with pivot joint is removable, repositionable, and reusable. The cable bundle hanger is installed without tools and there are no latches or hooks in the bridle ring to open or close.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A cable bundle hanger for securing cables to solar panels, the cable bundle hanger comprising:
   an attachment section for engaging a solar panel frame, the attachment section has an attachment member and a pivot joint ring; and
   a lower section pivotally secured to the attachment section, the lower section has a swaged top member;
   wherein the attachment member is configured with a horizontal C-shaped member to receive a vertical bolt;
   whereby the swaged top member pivots within the pivot joint ring thereby enabling the lower section to pivot with respect to the attachment section.

2. The cable bundle hanger of claim 1, wherein the attachment section further comprising a stem for creating space between the attachment member and the pivot joint ring.

3. The cable bundle hanger of claim 1, wherein the lower section further comprising a bridle ring for holding cables.

4. The cable bundle hanger of claim 3, wherein the bridle ring is open for facilitating the installation of cables.

5. The cable bundle hanger of claim 1, wherein the swaged top member provides a stop preventing the lower section from exiting the pivot joint ring when secured to the attachment section.

6. A cable bundle hanger for securing cables to solar panels, the cable bundle hanger comprising:
   an attachment section for engaging a solar panel frame, the attachment section has an attachment member and a pivot joint ring; and
   a lower section pivotally secured to the attachment section, the lower section has a swaged top member, wherein the swaged top member is a flattened portion of the cable bundle hanger at a top of the lower section;
   whereby the swaged top member pivots within the pivot joint ring thereby enabling the lower section to pivot with respect to the attachment section.

7. The cable bundle hanger of claim 6, wherein the attachment member is configured with a hooked member and a vertical member to engage a flange.

8. The cable bundle hanger of claim 6, wherein the attachment member is configured with a curved member to engage a horizontal bolt.

9. A cable bundle hanger for securing cables to solar panels, the cable bundle hanger comprising:
   an attachment section for engaging a solar panel frame, the attachment section has an attachment member and a pivot joint ring; and
   a lower section pivotally secured to the attachment section, the lower section has a swaged top member, wherein the swaged top member includes a front circular portion, a back circular portion, and curved outer edges;
   whereby the swaged top member pivots within the pivot joint ring thereby enabling the lower section to pivot with respect to the attachment section.

* * * * *